W. A. LEE.
AUTOMOBILE SIGNAL.
APPLICATION FILED OCT 2, 1919.
1,345,863.                                Patented July 6, 1920.
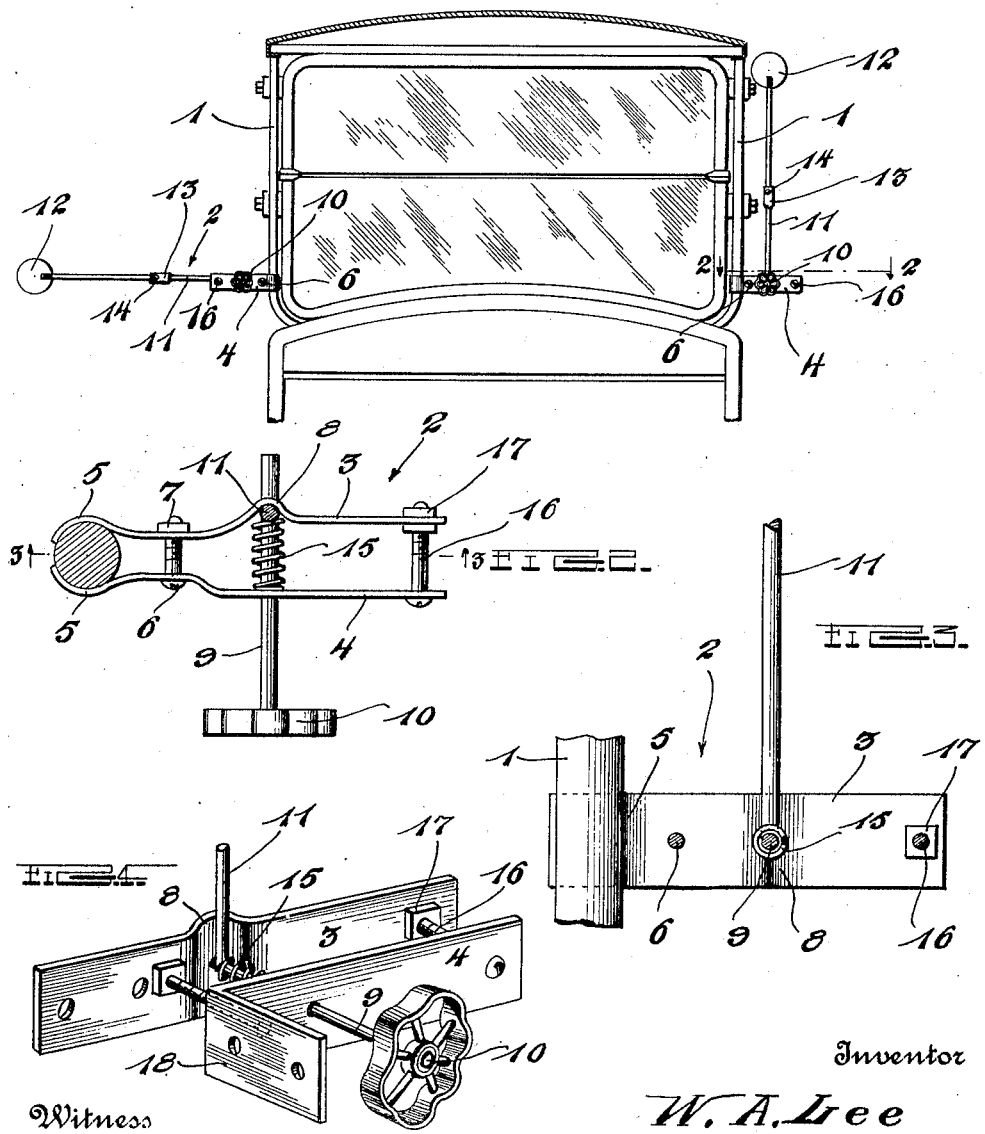
Witness
Inventor
W. A. Lee
By H. B. Wilson & Co.
Attorneys

UNITED STATES PATENT OFFICE.

WILLIAM A. LEE, OF MUSKOGEE, OKLAHOMA.

AUTOMOBILE-SIGNAL.

1,345,863.   Specification of Letters Patent.   Patented July 6, 1920.

Application filed October 2, 1919. Serial No. 327,914.

*To all whom it may concern:*

Be it known that I, WILLIAM A. LEE, a citizen of the United States, residing at Muskogee, in the county of Muskogee and State of Oklahoma, have invented certain new and useful Improvements in Automobile-Signals; and I do declare the following to be a full, clear, and exact description of the invention, such as will enable others skilled in the art to which it appertains to make and use the same.

This invention relates to automobile signals.

The primary object of the invention is to provide a manually actuated signal for automobiles which may be readily attached to the wind shield of an automobile within convenient reach of the driver whereby it may be readily moved to a position to indicate the direction in which the vehicle is going to turn, or whether it intends to reverse its direction of movement, or stop, as the case may be.

Another object of the invention is to produce a signal device which is of such construction that it may be readily attached either to a truck or a passenger vehicle.

A further object of the invention is to provide a signal device which is exceedingly simple in construction, strong, durable, effective in use, easy to operate and inexpensive to manufacture.

Other objects and advantages of the invention will become apparent during the course of the following description.

In the accompanying drawings forming a part of this specification and in which like numerals are employed to designate like parts throughout the same, Figure 1 is a view of a portion of an automobile and windshield, looking toward the front or from the inside, showing the manner of attaching my signal thereto.

Fig. 2 is a top plan view of a device constructed in accordance with my invention.

Fig. 3 is a section on the plane of the line 3—3 of Fig. 2.

Fig. 4 is a slightly modified form of my signal.

In the drawings, wherein for the purpose of illustration is shown a preferred embodiment of my invention the numeral 1 indicates the usual uprights of the windshield of an automobile to which my signal device, of an automobile to which my signal device, designated as a whole by 2, is attached.

The device comprises a pair of parallel spaced arms or sheet metal strips 3 and 4, and both of these strips are bent as at 5 to form a clamp which surrounds the upright 1. As is obvious, this clamping action is effected by the bolt and nut 6 and 7 which co-act with the strips 3 and 4. Of course the shape and design of the clamping portions 5 of these strips will be governed by the shape of the portion of the wind shield to which the device is attached. On different makes of cars, various designs of wind shield are employed, hence, the clamping portion of my device will be constructed accordingly. The strip 3 is bent between its ends to form a transverse seat or groove 8 at its inner side, the purpose of which will hereinafter be described. Extending through these arms or strips 3 and 4 at a point adjacent the center and through the seat 8 is a rotatable and slidable shaft 9 which is rotated by a suitable knob or handle 10. Connected to and carried by the shaft 9 is a laterally extending signal arm 11 which carries a semaphore or other suitable indicating member 12 which is connected thereto in any suitable manner, such as for instance by a socket 13 and set screw 14 as shown. Signal arm 11 which carries the semaphore 12 is moved to operative position by the knob 10, and when it is in an inoperative position it normally rests in the groove or seat 8. A coiled spring 15 serves to position the arm 11 in the seat 8, as is obvious. In other words, it will be seen that the coiled spring 15 surrounds the shaft 9 between the strip 4 and the signal arm 11, and the action of the spring between these parts will force the signal arm into its seat thus retain it in inoperative position. The opposite ends of the strips 3 and 4 are spaced apart by any suitable means, such as for instance by a bolt 16 and nuts 17. Bolt 16 not only serves as a spacing mean for the strips 3 and 4, but it also serves to limit the downward movement of the signal arm 11.

In use, the device is clamped in position on the upright 1 or on any other suitable part of the wind shield within convenient reach of the diver. I may employ either one or two of the devices, that is, I may attach one on the right side and one on the left side. Of course, only one will be necessary, and that one will be on the same side as the steering wheel, but in some instances I will employ two of the devices. The signal arm 11 will normally be in a vertical position, as shown at the right, and when the knob 10 is rotated it will be moved to a horizontal position. In its operative position it will rest on the bolt 16. Upon reverse rotation of the knob 10 the signal arm will again be moved to a vertical position and the spring 15 will force it in the groove 8 and retain it in this position. In order to indicate the direction of turning of the vehicle, the semaphore or disk 12 will have the proper directions thereon such as "right," "left" or "stop," etc. While I have shown the semaphore as being in the form of metal disk carried by an arm, I desire it to be understood that any other suitable similar device may be employed for the purpose.

In the modification shown in Fig. 4 all the parts of the device are the same except that portion which is intended to be clamped to the vehicle. This form of the device is especially applicable to trucks and is intended to be held in position by ordinary wood screws. To this end it will be seen that the strip 4 is bent laterally as at 18 and the plate 3 is straight instead of curved, thus affording a convenient means for attaching the device to trucks.

It is to be understood that the form of my invention herein shown and described is to be taken as a preferred form of the same and that various minor changes in the shape, size, and arrangement of parts may be resorted to without departing from the spirit of the invention or the scope of the subjoined claims.

I claim:

1. An automobile signal comprising a pair of spaced arms having means at one end for engagement with a stationary support, one of said arms being provided between its ends with a transversely extending seat at its inner side, said arms being also provided with alined openings, one of said openings extending through said seat, a shaft extending rotatably and slidably through said openings, a signal arm carried by said shaft and positioned between said arms and adapted to normally bear in said seat, spring means for shifting said shaft to normally position said signal arm in said seat, and means connecting the free ends of said arms, said means also serving to limit the downward movement of the signal arm, substantially as set forth.

2. An automobile signal comprising a pair of spaced metal strips bent at one of their ends for engagement with a stationary support, one of said strips being also bent between its ends to form a transverse seat, said strips being also provided with oppositely disposed alined openings, one of said openings extending through said transverse seat, a shaft passing through said openings, a handle for rotating said shaft, a laterally extending signal arm connected to said shaft between said strips, said signal arm being adapted to normally bear in said transverse seat, a coiled spring for manually positioning said signal arm in said seat, and a plurality of bolts extending through said strips to hold them in spaced relation, one of said bolts also serving to limit the downward movement of the signal arm.

In testimony whereof I have hereunto set my hand.

WILLIAM A. LEE.